United States Patent
Serre et al.

(10) Patent No.: US 8,227,537 B2
(45) Date of Patent: Jul. 24, 2012

(54) FINISHING COMPOUND SUITABLE FOR AN ACOUSTIC SUPPORT

(75) Inventors: Florence Serre, Moras (FR); Rita Faddoul, Grenoble (FR); Jean-Michel Faure, Oullins (FR); Claude Stock, Soleymieu (FR)

(73) Assignee: Lafarge Gypsum International, Paris (FR)

( * ) Notice: Subject to any disclaimer, the term of this patent is extended or adjusted under 35 U.S.C. 154(b) by 0 days.

(21) Appl. No.: 12/936,735

(22) PCT Filed: Apr. 21, 2009

(86) PCT No.: PCT/FR2009/000466
§ 371 (c)(1),
(2), (4) Date: Oct. 7, 2010

(87) PCT Pub. No.: WO2009/133316
PCT Pub. Date: Nov. 5, 2009

(65) Prior Publication Data
US 2011/0034608 A1  Feb. 10, 2011

(30) Foreign Application Priority Data
Apr. 22, 2008 (FR) ...................... 08 02224

(51) Int. Cl.
*C08K 3/26* (2006.01)
*C08L 31/00* (2006.01)

(52) U.S. Cl. ........................................ 524/425; 524/556
(58) Field of Classification Search ................... 524/425
See application file for complete search history.

(56) References Cited

U.S. PATENT DOCUMENTS

| 4,559,377 | A |   | 12/1985 | Gleason et al. |
| 5,338,349 | A | * | 8/1994 | Farrar ........................ 106/18.12 |
| 2004/0168399 | A1 |   | 9/2004 | Bonetto et al. |
| 2005/0139126 | A1 | * | 6/2005 | Khan et al. ..................... 106/437 |
| 2007/0181845 | A1 | * | 8/2007 | Hernandez et al. ............. 252/62 |

FOREIGN PATENT DOCUMENTS

| DE | 4324314 | 10/1994 |
| DE | 19614296 | 10/1996 |
| EP | 1143085 | 10/2001 |
| WO | WO 96/32450 | 10/1996 |
| WO | WO 2007/100510 | 9/2007 |

* cited by examiner

*Primary Examiner* — Hui Chin
(74) *Attorney, Agent, or Firm* — Pillsbury Winthrop Shaw Pittman, LLP

(57) ABSTRACT

A finishing compound having acoustic properties and including in percentage by weight relative to the total weight of the product, at least 25 to 80% of water; 0.1 to 5% of a thickening agent; 0.01 to 0.8% of a dispersing agent; 10 to 60% of a monogranular filler wherein the $D_{50}$ is greater than or equal to 100 μm; 0.5 to 6% of binder; and not including a foaming agent; and presenting permeability to air after evaporation of the water from 800 to 6000 mks Rayls.

18 Claims, No Drawings

FINISHING COMPOUND SUITABLE FOR AN ACOUSTIC SUPPORT

CROSS-REFERENCE TO RELATED APPLICATIONS

This is the U.S. National Stage of PCT/FR2009/000466, filed Apr. 21, 2009, which in turn claims priority to French patent application Ser. No. 08/02224, filed Apr. 22, 2008, the entire contents of all applications are incorporated herein by reference in their entireties.

The present invention relates to a finishing compound having acoustic properties.

Finishing compounds, also called decoration compounds or finishing or decoration coatings, are generally used to coat a support in order to give it the desired finishing corresponding to defined aesthetic criteria.

When decorating or improving the aesthetics of supports having acoustic properties, it is suitable to use specific finishing compounds, which will not disturb or alter the acoustic properties of their supports. In particular, it is suitable to not obstruct the porosity of the supports having acoustic properties. In other words, all finishing compounds are not suitable if the acoustic properties of the support, on which they are applied, are to be preserved. In particular, in the case of absorbing acoustic panels used to make suspended ceilings, it is necessary to use specific finishing compounds.

In order to meet industrial requirements it has become necessary to find a finishing compound having improved acoustic properties.

Therefore the problem which the present invention proposes to solve is to provide a product having acoustic properties and usable as a finishing compound.

With this aim the present invention provides a product comprising in percentage by weight relative to the total weight of the product, at least
- 25 to 80% of water;
- 0.1 to 5% of a thickening agent;
- 0.01 to 0.8% of a dispersing agent;
- 10 to 60% of a monogranular filler wherein the $D_{50}$ is greater than or equal to 100 µm;
- 0.5 to 6% of binder;

and not comprising a foaming agent.

The present invention also provides a finishing compound comprising the product described here above.

The present invention also provides a plaster board on which the finishing compound according to the present invention is applied.

Finally, the present invention relates to the use of a finishing compound according to the present invention for the production of elements for the construction field.

The present invention offers determining advantages, in particular the product according to the present invention preserves the acoustic properties of the support on which it is applied.

Advantageously, the product according to the invention can be used as a finishing compound for all types of ceiling boards, and in particular, plaster boards for ceilings.

The invention offers another advantage in that the product according to the present invention can be used for its acoustic properties and/or for its aesthetic properties.

Another advantage of the present invention, is that the compound comprises a high content of water, which ensures good workability of the compound, and facilitates the application of the compound during work on the site.

Another advantage of the present invention is that the product according to the present invention can be applied in mono-layers, which is to say that the application of a single layer of the product according to the present invention is enough to obtain the necessary acoustic properties and/or aesthetic properties.

Furthermore, the product according to the present invention has the advantage of having a good covering or lining capacity, which makes it possible to mask the joints made with the jointing compound.

Very advantageously, the product according to the present invention is suitable as a finishing compound for monolithic ceilings. The term <<monolithic ceiling>> is to be understood according to the present invention as a ceiling made up of a single element. For example it can be a ceiling comprising several plaster boards joined by a joint and covered by a finishing compound, giving the ensemble a monolithic appearance, that is to say, made up of a single element.

Finally, the present invention has the advantage of being able to be used in all industries, in particular the building industry and in all the construction markets (buildings, civil engineering, or pre-cast plants), in the industry of elements for the construction field, the construction industry of plaster elements.

Other advantages and characteristics of the present invention will clearly appear after reading the following description and the examples provided for non-limiting illustration and non-restrictive purposes.

The term <<acoustic properties>>, is to be understood as either:
- the capacity to absorb sound waves,
- the capacity to dissipate the energy of sound waves,
- the capacity to let sound waves pass,
- permeability to sound waves,
- transparency to sound waves,
- the capacity to reduce or remove the reverberation of sound waves, or
- the capacity to minimize the reflection of sound waves.

The term <<binders>>, is to be understood according to the present invention as any compound having the property of providing cohesion to the formulation in which it is incorporated. This binder is intended to bind inert elements such as fibres or granular fillers.

The term <<defoaming agent>>, is to be understood according to the present invention as any compound having the property of preventing or avoiding the formation of the dispersion of a gas phase in a liquid, a semi-liquid, a semi-solid or a solid, in particular preventing or avoiding the formation of foam.

The term <<wetting agent>>, is to be understood according to the present invention as any compound having the property of modifying the superficial tension of a liquid to facilitate the dispersion of fibres or avoid that the fibres flocculate.

The term <<thickening agent>>, is to be understood according to the present invention as any compound providing or facilitating the maintenance of the heterogeneous physical phases in equilibrium.

The term <<gum>>, is to be understood according to the present invention as vegetal exudates or extra cellular secretions of microbiological origin.

The term <<$D_{50}$>>, is to be understood according to the present invention as the median diameter of particles in a granulometric distribution cumulated by volume (the median diameter divides the distribution in two equal parts, 50% by volume of the particles have a size smaller than the $D_{50}$ and 50% by volume of the particles have a size larger than the $D_{50}$).

The term <<monogranular filler>>, is to be understood according to the present invention as a monodisperse filler. The term <<monodisperse>> is to be understood as a filler in which all the particles it comprises, have the same size. This means in other terms that the graphic representation of the granulometric distribution of the size of the particles (percentage by volume according to the size) only presents one single peak (one single population). This definition of a <<monogranular filler>> excludes a mix of particles of different sizes or excludes granular packing of several particles of different sizes.

Preferably, the product according to the present invention does not contain fine fillers. The term <<fine fillers>>, is to be understood according to the present invention as particles wherein the median diameter $D_{50}$ is strictly less than 100 μm.

The term <<elements for the construction field>>, is to be understood according to the present invention as any element being part of a construction, for example a floor, a screed, a foundation, a wall, a partition wall, a ceiling, a beam, a work top, a pillar, a bridge pier, a concrete block, a pipe, a post, a cornice, an element of road works (for example a border of a pavement) a roof tile.

First of all the present invention provides a product comprising in percentage by weight relative to the total weight of the product, at least 25 to 80% of water;
0.1 to 5% of a thickening agent;
0.01 to 0.8% of a dispersing agent;
10 to 60% of a monogranular filler wherein the $D_{50}$ is greater than or equal to 100 μm;
0.5 to 6% of binder;

and not comprising a foaming agent.

Preferably the product according to the present invention, after drying, is a porous product or permeable to air.

Preferably the product according to the present invention, after evaporation of the water, is a porous product or permeable to air.

Preferably the product according to the present invention has permeability to air, after evaporation of the water, from 800 to 6000 mks Rayls.

The product according to the present invention comprises from 25 to 80% of water, preferably from 30 to 70%, more preferably from 35 to 60%, even more preferably from 40 to 50% percentage by weight relative to the total weight of the product. The suitable water according to the present invention can be tap water.

According to a variant of the present invention, the product may comprise from 0.001 to 10% of a defoaming agent, preferably from 0.1 to 5% of a defoaming agent, percentage by weight relative to the total weight of the product.

The product according to the present invention comprises from 0.1 to 5% of a thickening agent, preferably from 0.5 to 2.5% of a thickening agent, even more preferably from 0.5 to 1.5% of a thickening agent, percentage by weight relative to the total weight of the product.

The suitable thickening agents according to the present invention are preferably gums, cellulose and its derivatives such as cellulose ethers or carboxymethyl cellulose, starch and its derivatives, gelatine, agar, carrageenans. Preferably the product according to the present invention comprises gums as the thickening agent. The suitable gums as thickening agents according to the present invention are preferably selected from the Acacia, Tragacanth, Carob, Dextran, Diutan, Gellan, Guar, Scleroglucan, Xanthan, Welan gums. The preferred gum according to the present invention as the thickening agent is the xanthene xanthan gum.

The product according to the present invention comprises from 0.01 to 0.8% of a dispersing agent, preferably from 0.1 to 0.5% of a dispersing agent, even more preferably from 0.1 to 0.25%, percentage by weight relative to the total weight of the product.

The product according to the present invention comprises from 10 to 60% of a monogranular filler wherein the $D_{50}$ is greater than or equal to 100 μm, in particular from 20 to 55% of the monogranular filler, preferably from 30 to 50% of the monogranular filler, more preferably 35 to 50%, and finally even more preferably 40 à 45%, percentage by weight relative to the total weight of the product.

Suitable monogranular fillers according to the present invention are preferably calcium carbonate, dolomite (calcium carbonate and magnesium carbonate), silica, talc, mica, anhydrous or dehydrated calcium sulphate, barium sulphate or mixtures thereof. According to a variant of the present invention the suitable monogranular fillers according to the present invention may be a mix of calcium carbonate and glass beads, being understood that the percentage of glass beads is less than or equal to 14%, in percentage by weight relative to the total weight of the product. According to another variant of the present invention the suitable monogranular fillers according to the present invention do not comprise glass beads.

Preferably the suitable monogranular fillers according to the present invention are calcium carbonate. More particularly, the suitable calcium carbonate according to the present invention has a $D_{50}$ greater than or equal to 100 μm, preferably from 100 μm to 2 mm, more preferably from 110 μm to 500 μm, even more preferably from 120 μm to 250 μm. Finally the preferred calcium carbonate according to the present invention has a $D_{50}$ equal to 200 μm. The values are measured by laser diffraction, preferably using a Malvern MS2000 granulometer type of instrument with the dry method.

The product according to the present invention may further comprise from 0.1 to 5% of synthetic or animal fibres, preferably from 1 to 3% of synthetic or animal fibres, percentage by weight relative to the total weight of the product. The suitable synthetic fibres according to the present invention can be polyamide fibres, polypropylene fibres, polyester fibres, polyacrylonitrile fibres. The preferred fibres according to the present invention are synthetic fibres, in particular polyamide fibres.

Preferably, the product according to the present invention does not contain vegetal fibres.

The product according to the present invention comprises from 0.5 to 6% of binder, preferably from 1.0 to 5% of binder, more preferably 1.5 to 4%, even more preferably 1.5 to 2%, percentage by weight relative to the total weight of the product. The binder makes it possible to ensure the cohesion of the product according to the present invention. The suitable binder according to the present invention can be an acrylic polymer, a styrene acrylic polymer, a vinyl polymer, mixtures and derivatives thereof. The preferred binder according to the present invention is an acrylic polymer, in particular a styrene acrylic polymer.

The product according to the present invention may further comprise additional additives, for example wetting agents, coalescing agents, fluidizing agents, bacterial agents, fungal agents, heavy solvents, pigments, photocatalytic pigments.

According to a variant of the present invention, the product may further comprise from 0.05 to 1% of a wetting agent. The suitable wetting agents according to the present invention are preferably alcohols, polyols and in particular diols.

According to another variant of the present invention, the product may further comprise from 0.01 to 5% of a coalescing agent. The suitable coalescing agents according to the present invention are preferably glycol ethers.

The product according to the present invention may further comprise a heavy solvent. The suitable heavy solvents according to the present invention are preferably hexylene glycol or butylene carbonate.

According to another variant of the present invention, the product may further comprise one or more pigments alone or in combination. The suitable pigments according to the present invention are preferably titanium dioxide The product according to the present invention may further comprise one or more photocatalytic pigments. Suitable photocatalytic pigments according to the present invention may be photocatalytic titanium dioxide.

Preferably, the product according to the present invention does not comprise clay.

Preferably, the product according to the present invention does not comprise zinc pyrithione.

The product according to the present invention can be made by mixing successively with water in a mixer the various constituents of the product.

The product according to the present invention can be applied in one single application. This means that it is not necessary to apply several layers of the product according to the present invention to obtain a satisfactory result. It is to be noted that a result is considered satisfactory when the quantity of the product according to the present invention on a support is from 0.7 to 3.5 kg/m$^2$.

The product according to the present invention has a quantity of product after one single application on a support from 0.7 to 3.5 kg/m$^2$, preferably from 1.0 to 3.0 kg/m$^2$, more preferably from 1.0 to 2.5 kg/m$^2$, even more preferably from 1.5 to 2.0 kg/m$^2$.

The product according to the present invention has the advantage of being able to be applied by different methods, for example the trowel application method, the roller application method, the spraying application method. The preferred application method is the spraying method, in particular the application method using the hose lance or with a big volume-low pressure spraying apparatus or with an "airless" apparatus.

When the product is applied on its support in one layer, called the application layer, the thickness of the said layer is from 0.5 mm to 2 mm, preferably from 0.7 mm to 1.5 mm, even more preferably from 0.8 mm to 1.3 mm.

The product according to the present invention after evaporation of the water has a flow resistance to air greater than or equal to 800 mks Rayls (Ns m$^{-3}$), preferably from 800 to 6000 mks Rayls, preferably from 950 to 5000 mks Rayls, even more preferably from 1000 to 3500 mks Rayls measured according to the ASTM C522-87 standard.

After application on its support, the product is preferably left to dry, at ambient temperature.

After drying, the product according to the present invention is preferably a porous product or permeable to air. The term <<permeable to air>> is to be understood as a product having a flow resistance to air greater than or equal to 800 mks Rayls (Ns m$^{-3}$), preferably from 800 to 6000 mks Rayls, even more preferably from 1000 to 3500 mks Rayls measured according to the ASTM C522-87 standard.

The present invention also relates to a finishing compound comprising the product according to the present invention as described here above.

The finishing compound according to the present invention is preferably a porous compound or permeable to air. The term <<permeable to air>> is to be understood as a compound having a flow resistance to air greater than or equal to 800 mks Rayls (Ns m$^{-3}$), preferably from 800 to 6000 mks Rayls, preferably from 950 to 5000 mks Rayls, even more preferably from 1000 to 3500 mks Rayls measured according to the ASTM C522-87 standard.

The finishing compound according to the present invention is preferably a compound which does not modify the acoustic properties of the said support on which it is applied.

The finishing compound according to the present invention is preferably a compound which does not modify the permeability to air of the support on which it is applied.

The compound according to the present invention may be used either for its acoustic properties and/or for its aesthetic properties.

The compound according to the present invention can be applied on many supports, in particular for example a floor, a wall, a partition wall, a ceiling, a beam, a work top, a cornice, and other types of supports.

The present invention also provides a panel based on gypsum, in particular a plaster board, on which the finishing compound according to the present invention is applied as described hereabove.

Finally, the present invention also relates to the use of a finishing compound according to the present invention for the production of elements for the construction field.

The following examples illustrate the invention without limiting it.

EXAMPLES

Reactants used:
The reactants used in the different formulations of the product according to the present invention are crowed in table I herebelow.

TABLE I

|  | Trade Name | Chemical Name | Supplier |
|---|---|---|---|
| Solvent | Tap water | Water |  |
| Dispersing agent | Coatex P90 | Ammonium Polycarboxylate | Coatex |
| Wetting agent | Envirogem 360 | Diol | Air products |
| Defoaming agent | Clerol PLB847 |  | Cognis |
| Thickening agent | Actigum CS 6 | Scleroglucan | Cargill |
|  | Satiaxane CX90T | Xanthan gum | Cargill |
|  | Kelzan RD | Xanthan gum | Kelco |
| Monogranular filler | Durcal 130 | Calcium carbonate | Omya |
|  | Beatite 350-630 μm | Calcium carbonate | Omya |
|  | Poraver 0.5-1 mm | Glass beads | Poraver |
| Fibres | PP Stavon 18/4 | Polypropylene fibres | Trevos |
|  | Rhoximat NYL 4 mm | Polyamide fibres | Rhodia |

TABLE I-continued

| | Trade Name | Chemical Name | Supplier |
|---|---|---|---|
| Pigment | Tiona 568 | Titanium dioxide | Millenium chemicals |
| | Tiona 595 | Titanium dioxide | Millenium chemicals |
| Binder | Acronal S790 | Styrene latex/acrylic latex | BASF |
| | Acronal S559 | Styrene latex/acrylic latex | BASF |
| Coalescing agent | Dowanol PnB | Glycol ether | Dow chemicals |
| Heavy solvent | Jeffsol BC | Butylene carbonate | Hunstmann |
| Biocide agent | Mergal 723K | Solution of isothiazolinone and a compound of fatty amine | Troy |
| | Acticide MBS | Encapsulated isothiazolinone | Thor |

Equipment:
Rayneri Laboratory Mixer Disperser equipped with a dispersion blade.
High-speed Mixer Disperser, Argon A17.5 model equipped with a mixing shaft with a speed variator, Zanelli brand.
Hose lance: Projection ensemble, 6P model, Europro brand comprising a machine with a stainless steel monoblock hopper and a volumetric screw pump entrained by an a non-synchronized motor coupled with a reducer, associated with a compressor and a hose lance equipped with a nozzle, diameter 3 mm.

Operating Procedure: making the compound of Example 1 according to the present invention:

In the mixing bowl, 43.49 parts of tap water were introduced.

Under 400 rpm stirring, 0.13 part of the Coatex P90 dispersing agent, 0.11 part of the Envirogem 360 wetting agent, 0.02 part of the Clerol PLB847 defoaming agent and 0.63 part of the Actigum CS6 thickening agent were successively introduced over a period of five minutes.

The stirring was progressively increased up to 2500 rpm whilst adding 45.01 parts of the Durcal 130 monogranular filler, 5.00 parts of the Tiona 595 titanium dioxide pigment and 2.00 parts of the Rhoximat NYL0.8 fibre over a period of twenty minutes.

The stirring was reduced to 1000 rpm whilst adding 3.00 parts of the Acronal S790 binder, 0.31 part of the Dowanol PNB coalescing agent and 0.31 part of the Mergal 723K biocide agent over a period of three minutes.

The quantities of the constituents are given in percentage by weight relative to the total weight of the product.

The compounds according to the invention:

Different compounds according to the present invention were made, compounds 2 to 13, according to the operating procedure of Example 1 described here above. Table II here below describes the chemical composition of compounds 1 to 8 and Table III describes the chemical composition of compounds 9 to 15 in percentage by weight relative to the total weight of the product.

TABLE II

| Family | Compound | 1 | 2 | 3 | 4 | 5 |
|---|---|---|---|---|---|---|
| Solvent | Water | 43.49 | 33.34 | 26.86 | 27.99 | 28.08 |
| Dispersing agent | Coatex P90 | 0.13 | 0.04 | 0.11 | 0.25 | 0.11 |
| Wetting agent | Envirogem 360 | 0.11 | | | | |
| Defoaming agent | Clerol PLB847 | 0.02 | 0.02 | | | |
| Thickening agent | Rheo 3000 | | | 0.77 | 1.78 | 2.01 |
| | Actigum CS 6 | 0.63 | 0.46 | | | |
| Filler | Beatite 350-630 µm | | | | | 38.97 |
| | Durcal 130 | 45.01 | 46.10 | 49.88 | 58.02 | |
| | Poraver 0.5-1 | | 10.15 | 11.08 | | |
| Fibre | PP Stavon 18/4 | | | | | 1.02 |
| | Rhoximat NYL 0.8 | 2.00 | | | | |
| Pigment | Tiona 568 | 5.00 | 5.54 | 5.97 | 5.09 | 6.30 |
| Binder | Acronal S790 | 3.00 | 3.69 | 4.69 | 5.09 | 4.58 |
| Coalescing agent | Dowanol PnB | 0.31 | 0.37 | 0.60 | 0.76 | 0.57 |
| Biocide agent | Mergal 723K | 0.31 | 0.28 | 0.04 | | |
| | | 100.00 | 100.00 | 100.00 | 100.00 | 80.63 |

TABLE III

| Family | Compound | 6 | 7 | 8 | 9 | 10 | 11 |
|---|---|---|---|---|---|---|---|
| Solvent | Water | 28.78 | 28.97 | 29.15 | 44.61 | 75.97 | 45.00 |
| Dispersing agent | Coatex P90 | 0.25 | 0.13 | 0.50 | 0.10 | 0.17 | 0.10 |
| Wetting agent | Envirogem 360 | | | | 0.10 | 0.17 | 0.10 |
| Defoaming agent | Clerol PLB847 | | | | | | |
| Thickening agent | Rheo 3000 | 1.99 | 1.69 | 1.26 | | | |
| | Actigum CS 6 | | | | 1.01 | | |
| | Kelzan RD | | | | | 0.39 | 1.10 |
| Filler | Beatite 350-630 | | 55.79 | | | | |
| | Durcal 130 | 57.57 | | 57.29 | 43.85 | 18.88 | 42.00 |
| Fibre | Fibres PA 4 mm | | 1.19 | | | | |
| | PP Stavon | | | 1.01 | | | |

TABLE III-continued

| Family | Compound | 6 | 7 | 8 | 9 | 10 | 11 |
|---|---|---|---|---|---|---|---|
| | PP (2.2/4) | 0.99 | | | | | |
| | Axilat NYL0.8 | | | | 2.02 | 0.86 | 2.00 |
| | Rhoximat NYL 0.8 | | | | | | |
| Pigment | Tiona 568 | 4.96 | 6.44 | 5.03 | 5.04 | 2.15 | 5.00 |
| Binder | Acronal S790 | 4.96 | 5.15 | 5.03 | 3.02 | 1.29 | |
| | Acronal S559 | | | | | | 4.30 |
| Coalescing agent | Dowanol PnB | 0.50 | 0.64 | 0.75 | 0.25 | 0.13 | |
| Heavy solvent | Jeffsol BC | | | | | | 0.40 |
| Biocide agent | Mergal 723K | | | | | | |
| | Acticide MKE (N) | | | | | | |
| | Acticide MBS | | | | | | |
| | | 100.00 | 100.00 | 100.00 | 100.00 | 100.00 | 100.00 |

Measurement of the permeability to air of each compound:

Permeability to air was estimated from a measurement of resistivity to air. The measurements were done using a resistance meter, generally called ohmmeter. The difference of pressure in inches of water was measured for an air flow of 17% between the sample and a control plate of glass through a 5-cm diameter aperture. Each time, 5 measurements corresponding to 5 different values of air flow were made. The higher the obtained value, the greater the resistance to the passing of air, the sample will then be less porous and less permeable.

$$\text{(Permeability mks Rayls)} = (\Delta P_{inch\ H2O} \times 149.4)/1.49 \times 10^5 \times (5.10^{-2})^2/4$$

The results are given in the following Table IV:

TABLE IV

| Compounds | 1 | 2 | 3 | 4 | 5 | 6 | 7 | 8 | 9 | 10 | 11 |
|---|---|---|---|---|---|---|---|---|---|---|---|
| Permeability mks rayls | 2834 | 3169 | 1142 | 1122 | 2027 | 984 | 1732 | 866 | 2421 | 1771 | 1899 |

Compounds 1 to 11 according to the present invention were permeable to air.

Acoustic measurement test:

Compounds 12 and 13 were applied on plasterboards having acoustic properties. The compounds were applied using a hose lance (pump speed: 2.5 and atomisation pressure: 30 psi).

The Ensemble is Referred to as the <<system>>

The measurement method of the noise reduction coefficient (NRC) was the method described in the ASTM C423-02A Standard, using a room with a volume of 114 m³.

Acoustic measurements were done on these systems.

TABLE V

| | | Compounds | |
|---|---|---|---|
| | | 12 | 13 |
| Solvent | Water | 33.34 | 45.60 |
| Dispersing agent | Coatex P90 | 0.04 | 0.10 |
| Wetting agent | Envirogem 360 | | 0.10 |
| Defoaming agent | Clerol PLB847 | 0.02 | 0.10 |
| Thickening agent | Actigum CS 6 | 0.46 | |
| | Kelzan RD | | 0.60 |
| Filler | Durcal 130 | 46.10 | 42.14 |
| | Poraver 0.5-1 | 10.15 | |
| Fibre | Rhoximat NYL 0.8 | | 2.01 |
| Pigment | Tiona 568 | 5.54 | |
| | Tiona 595 | | 5.02 |

TABLE V-continued

| | | Compounds | |
|---|---|---|---|
| | | 12 | 13 |
| Binder | Acronal S790 | 3.69 | |
| | Acronal S559 | | 4.32 |
| Coalescing agent | Dowanol PnB | 0.37 | |
| Biocide agent | Mergal 723K | 0.28 | |
| | Acticide MKE (N) | | 0.25 |
| | Acticide MBS | | 0.19 |
| | | 100.00 | 100.00 |
| Application weight | g/m² | 918 | 1012 |
| Permeability | mks rayls | 2116 | |

TABLE V-continued

| | Compounds | |
|---|---|---|
| | 12 | 13 |
| NRC board alone | 0.55 | 0.8 |
| NRC board + compound | 0.55 | 0.75 |

Compounds 12 and 13 were permeable to air, and did not or only slightly modify the acoustic properties of the support on which they were applied. When the non-coated plaster board had a NRC of 0.55, the same board coated with compound 12 (system) had a NRC of 0.55. Likewise, when the non-coated plaster board had a NRC of 0.80, the same board coated with compound 13 (system) had a NRC of 0.75.

The invention claimed is:

1. A product comprising in percentages by weight relative to the total weight of the product, at least
   25 to 80% of water;
   0.1 to 5% of a thickening agent;
   0.01 to 0.8% of a dispersing agent;
   10 to 60% of a monogranular filler wherein the $D_{50}$ is greater than or equal to 100 µm, the monogranular filler including one or more materials;
   0.5 to 6% of binder;
   and not comprising a foaming agent and a filler other than said monogranular filler.

2. The product according to claim 1, comprising from 0.001 to 10% of a defoaming agent.

3. The product according to claim 1, comprising from 0.5 to 1.5% of a thickening agent.

4. The product according to claim 1, wherein the product presents permeability to air, after evaporation of the water, from 800 to 6000 mks Rayls.

5. The product according to claim 1, comprising from 0.1 to 0.5% of a dispersing agent.

6. The product according to claim 1, comprising from 35 to 50% of a monogranular filler.

7. The product according to claim 1, comprising calcium carbonate as the monogranular filler wherein the $D_{50}$ is comprised from 100 µm to 2 mm.

8. A product comprising in percentages by weight relative to the total weight of the product, at least
   25 to 80% of water;
   0.1 to 5% of a thickening agent;
   0.01 to 0.8% of a dispersing agent;
   10 to 60% of a monogranular filler wherein the $D_{50}$ is greater than or equal to 100 µm, the monogranular filler including one or more materials;
   0.5 to 6% of binder;
   and not comprising a foaming agent and a filler other than said monogranular filler, and
   from 0.1 to 5% of synthetic fibres.

9. A product comprising in percentages by weight relative to the total weight of the product, at least
   25 to 80% of water;
   0.1 to 5% of a thickening agent;
   0.01 to 0.8% of a dispersing agent;
   10 to 60% of a monogranular filler wherein the $D_{50}$ is greater than or equal to 100 µm, the monogranular filler including one or more materials;
   0.5 to 6% of binder;
   and not comprising a foaming agent and a filler other than said monogranular
   wherein the product has a quantity of product, after one single application on a support, from 0.7 to 3.5 kg/m$^2$.

10. The product according to claim 1, further comprising one or more photocatalytic pigments.

11. A finishing compound comprising a product according to claim 1.

12. The finishing compound according to claim 11, wherein the compound is permeable to air.

13. The finishing compound according to claim 12, wherein the compound is a compound which does not modify the permeability to air of the support on which it is applied.

14. A gypsum panel on which is applied the finishing compound according to claim 11.

15. A method comprising preparing a finishing compound according to claim 11 for the production of elements for the construction field.

16. The product according to claim 1, wherein the one or more materials are selected from the group consisting of calcium carbonate, dolomite, silica, talc, mica, anhydrous or dehydrated calcium sulphate, barium sulphate, glass beads and mixtures thereof.

17. The product according to claim 8, wherein the one or more materials are selected from the group consisting of calcium carbonate, dolomite, silica, talc, mica, anhydrous or dehydrated calcium sulphate, barium sulphate, glass beads and mixtures thereof.

18. The product according to claim 9, wherein the one or more materials are selected from the group consisting of calcium carbonate, dolomite, silica, talc, mica, anhydrous or dehydrated calcium sulphate, barium sulphate, glass beads and mixtures thereof.

* * * * *